US008159421B2

(12) United States Patent
Hwang et al.

(10) Patent No.: US 8,159,421 B2
(45) Date of Patent: Apr. 17, 2012

(54) ORGANIC LIGHT EMITTING DIODE DISPLAY

(75) Inventors: Soonjae Hwang, Gumi-si (KR); Sangkeun Lee, Uiwang-si (KR); Woojin Nam, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 753 days.

(21) Appl. No.: 12/292,849

(22) Filed: Nov. 26, 2008

(65) Prior Publication Data

US 2009/0207105 A1 Aug. 20, 2009

(30) Foreign Application Priority Data

Feb. 19, 2008 (KR) ........................ 10-2008-0015064

(51) Int. Cl.
*G09B 3/30* (2006.01)

(52) U.S. Cl. ................................ 345/76; 345/77; 345/82

(58) Field of Classification Search .................... 345/76, 345/77, 82, 690; 365/145
See application file for complete search history.

(56) References Cited

U.S. PATENT DOCUMENTS

2006/0028408 A1* 2/2006 Kim ................................ 345/76
2006/0208973 A1* 9/2006 Lee et al. ........................ 345/76
2006/0221662 A1* 10/2006 Park et al. ..................... 365/145

* cited by examiner

*Primary Examiner* — Nitin Patel
*Assistant Examiner* — Towfiq Elahi
(74) *Attorney, Agent, or Firm* — McKenna Long & Aldridge, LLP

(57) ABSTRACT

An organic light emitting diode (OLED) display including a plurality of data lines to which a data voltage is supplied, a plurality of pairs of gate lines each comprising a first gate lines to which a first scan pulse is supplied and a second gate lines to which a second scan pulse partially overlapping the first scan pulse in an opposed phase is supplied, an OLED that emits light by current that flows between the high potential driving voltage source and the low potential driving voltage source, a driving device for controlling the current that flows through the OLED in accordance with a gate-source voltage applied between a gate electrode connected to a first node and a source electrode connected to the low potential driving voltage source, a storage capacitor connected between the first node and the second node, and a switch circuit.

7 Claims, 8 Drawing Sheets

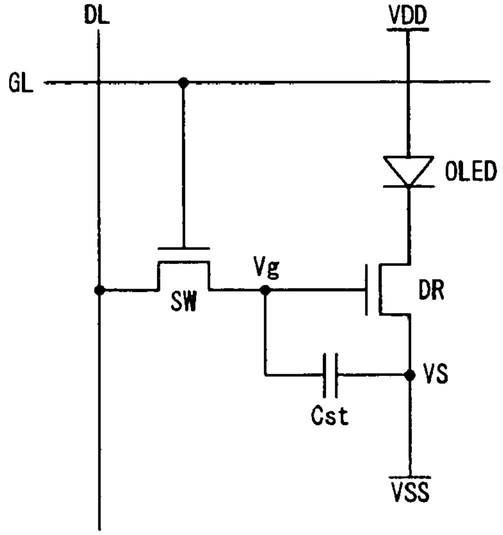
FIG. 2
(Related Art)
FIG. 3
(Related Art)
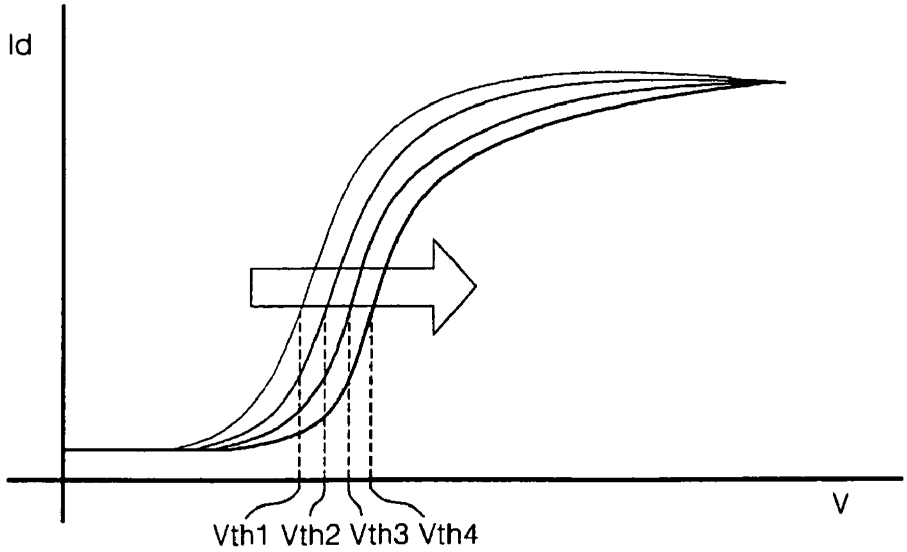

ORGANIC LIGHT EMITTING DIODE DISPLAY

This application claims the benefit of Korean Patent Application No. 10-2008-0015064, filed Feb. 19, 2008, which is hereby incorporated by reference in its entirety for all purposes as if fully set forth herein.

BACKGROUND OF THE INVENTION

1. Field of the Invention

The present invention relates to an organic light emitting diode (OLED) display, in particular, to an organic light emitting diode (OLED) display capable of increasing the life thereof and of improving display quality and a method of driving the same.

2. Discussion of the Related Art

Recently, various flat panel displays (FPD) having reduced reducing weight and volume compared to cathode ray tubes (CRT) based displays are being developed. The FPDs include liquid crystal displays (LCD), field emission displays (FED), plasma display panels (PDP), and electroluminescence devices.

Because the structure and manufacturing processes of the PDP are simple, the PDP is spotlighted as a display that is light, thin, short, and small and that is advantageous for use in large screen display applications. However, the PDP has low light emitting efficiency and brightness and large power consumption. A thin film transistor (TFT) LCD in which a TFT is used as a switching device is one of the most widely used FPDs. However, because the TFT LCD is a non-emitting device, the TFT LCD has a narrow viewing angle and low response speed.

Electric field light emitting devices are classified as inorganic light emitting diode displays or organic light emitting diode (OLED) displays in accordance with the material of an emission layer. In particular, the OLED display responds at high speed and has high light emitting efficiency, brightness, and a wide viewing angle due to using a self-emitting device.

An OLED for a display is illustrated in FIG. 1. The OLED include organic compound layers such as a hole injection layer (HIL), a hole transport layer (HTL), an emission layer (EML), an electron transport layer (ETL), and an electron injection layer (EIL) formed between an anode electrode and a cathode electrode.

The organic compound layers include a hole injection layer (HIL) **78*e*, a hole transport layer (HTL) 78*d*, an emission layer (EML) 78*c*, an electron transport layer (ETL) 78*b*, and an electron injection layer (EIL) 78*a***.

When a driving voltage is applied between the anode electrode and the cathode electrode, holes that pass through the HTL **78*d* and electrons that pass through the ETL 78*b*, meet in the emission layer (EML) 78*c* to form excitons. As a result, the EML 78*c*** generates visible rays.

The OLED display includes a matrix of pixels each including an OLED, and controls the brightness of pixels selected by a scan pulse in accordance with the gray scale of digital video data.

The OLED displays may be operated using a passive matrix method or using an active matrix method in which the TFT is used as the switching device.

In the active matrix method, a TFT employed as an active device is selectively turned on to select pixels and the luminescence of the pixels is sustained by a voltage sustained in a storage capacitor.

FIG. 2 is a circuit diagram schematically illustrating one pixel in the OLED display employing the active matrix method.

Referring to FIG. 2, the pixel of the OLED display in the active matrix method includes an OLED, a data line DL and a gate line GL that cross each other, a switch TFT SW, a driving TFT DR, and a storage capacitor Cst. The switch TFT SW and the driving TFT DR are realized using N-type MOSFETs.

The switch TFT SW is turned on in response to the scan pulse from the gate line GL to allow a current flow through a current path between the source electrode and the drain electrode thereof. In the on time period of the switch TFT SW, the data voltage from the data line DL is applied to the gate electrode of the driving TFT DR and the storage capacitor Cst via the source electrode and the drain electrode of the switch TFT SW.

The driving TFT DR controls the current that flows through the OLED in accordance with a voltage difference Vgs between the gate electrode and the source electrode thereof.

The storage capacitor Cst stores the data voltage applied to one electrode thereof to maintain the voltage supplied to the gate electrode of the driving TFT DR for one frame.

The OLED has the structure illustrated in FIG. 1. The OLED is connected between the source electrode of the driving TFT DR and a low potential driving voltage source VSS.

The brightness of the pixel illustrated in FIG. 2 is in proportion to the current that flows through the OLED. The current flowing through the OLED is determined by the difference voltage between the gate voltage and the source voltage of the driving TFT DR, the threshold voltage of the driving TFT DR, and the data voltage as illustrated in EQUATION 1.

$$\begin{aligned} Vgs &= Vg - Vs \\ Vg &= Vdata,\ Vs = Vss \\ Ioled &= \frac{k}{2}(Vgs - Vth)^2 \\ &= \frac{k}{2}(Vdata - Vss - Vth)^2 \end{aligned} \quad \text{[EQUATION 1]}$$

In EQUATION 1, Vgs represents a difference voltage between the gate voltage Vg and the source voltage Vs of the driving TFT DR, Vdata represents the data voltage, Vss represents the low potential driving voltage, Ioled represents the driving current, Vth represents the threshold voltage of the driving TFT DR, and k represents a constant value determined by the mobility and the parasitic capacitance of the driving TFT DR As illustrated in EQUATION 1, the current Ioled of the OLED is remarkably affected by the threshold voltage Vth of the driving TFT DR.

In general, when a gate voltage of the same polarity is applied to the gate electrode of the driving TFT DR for a long time, gate-bias stress is increased so that the threshold voltage Vth of the driving TFT DR is increased, thus changing the operation characteristic of the driving TFT DR. A change in the operation characteristic of the driving TFT DR is illustrated in the experiment result of FIG. 3.

FIG. 3 illustrates that the characteristic curve for a sample hydrogenised amorphous silicon (A-Si:H) TFT changes when positive gate-bias stress is applied to an A-Si:H TFT whose channel width/channel length W/L is 120 μm/6 μm. In FIG. 3, the axis of abscissa represents the gate voltage V of the A-Si:H TFT as the sample and the axis of ordinate represents current A between the source electrode and the drain electrode of the A-Si:H TFT as the sample.

FIG. 3 illustrates the shift in the threshold voltage and the transmission characteristic curve of the TFT with the increase in voltage application time when a voltage of +30V is applied to the gate electrode of the A-Si:H TFT as an example. As illustrated in FIG. 3, as the duration for applying a positive voltage to the gate electrode of the A-Si:H TFT increases, the transmission characteristic curve of the TFT moves to the right and the threshold voltage of the A-Si:H TFT increases. In the illustrated example, the threshold voltage increases from Vth1 to Vth4.

The increase in the threshold voltage of the driving TFT DR makes the operation point of the driving TFT DR unstable, reducing the life of the display. For example, in the pixel circuit illustrated in FIG. 2, when the threshold voltage Vth of the driving TFT DR increases from 1.5V to 2V, although the same data voltage is applied, the amount of driving current is reduced to 70% of the initial value. In addition, when pixels are driven by data voltages having different magnitudes in a uniform period, the deterioration degree of the driving TFT DR of the pixel to which a relatively large data voltage is accumulatively applied is larger than the deterioration degree of the driving TFT DR of the pixel to which a relatively small data voltage is accumulatively applied. Therefore, when the same data voltage is subsequently applied to the pixels, the amount of the current that flows through the OLED varies with each pixel, reducing display quality.

SUMMARY OF THE INVENTION

Accordingly, the present invention is directed to an organic light emitting diode (OLED) display that substantially obviates one or more of the problems due to limitations and disadvantages of the related art An advantage of the present invention is to provide an organic OLED display capable of preventing the current that flows through the OLED from being affected by a change in the threshold voltage of a driving TFT so that the life of the display is increased and that display quality is improved and a method of driving the same.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings To achieve these and other advantages and in accordance with the purpose of the present invention, as embodied and broadly described, there is provided an organic light emitting diode (OLED) display, including: a plurality of data lines to which a data voltage is supplied; a plurality of pairs of gate lines each comprising a first gate line to which a first scan pulse is supplied and a second gate line to which a second scan pulse partially overlapping the first scan pulse in an opposed phase is supplied; a high potential driving voltage source for generating a high potential driving voltage; a low potential driving voltage source for generating a low potential driving voltage; a sustain driving voltage source for generating a sustain driving voltage having a value between the high potential driving voltage and the low potential driving voltage; an OLED that emits light in response to a current that flows from the high potential driving voltage source to the low potential driving voltage source and that flows through the OLED; a driving device for controlling the current that flows through the OLED in accordance with a gate-source voltage applied between a gate electrode connected to a first node and a source electrode connected to the low potential driving voltage source; a storage capacitor connected between the first node and the second node; and a switch circuit for charging the first node by a reset voltage in a first period, for discharging the reset voltage to sustain a potential of the first node as a sum of a threshold voltage of the driving device and the low potential driving voltage and to supply the data voltage to the second node in a second period following the first period, and for increasing a potential of the second node from the data voltage by a voltage difference between the sustain driving voltage and the data voltage in a third period following the second period, in response to the first and second scan pulses.

The first period is a reset period between a rising edge of the first scan pulse and a falling edge of the second scan pulse generated later than the rising edge of the first scan pulse, the second period is a threshold voltage sensing period between a falling edge of the second scan pulse and a rising edge of the second scan pulse generated at a moment when a falling edge of the first scan pulse is generated, and the third period is an emission period defined as a low logic period of the first scan pulse that starts from the falling edge of the first scan pulse and a high logic period of the second scan pulse that starts from the rising edge of the second scan pulse.

The current that flows through the OLED in the emission period is obtained by following equations $$Vg = Vsus - Vdata + Vss + Vth,\ Vs = Vss$$

$$Vgs = Vsus - Vdata + Vth$$

$$\begin{aligned} Ioled &= \frac{k}{2}(Vgs - Vth)^2 \\ &= \frac{k}{2}(Vsus - Vdata + Vth - Vth)^2 \\ &= \frac{k}{2}(Vsus - Vdata)^2 \end{aligned}$$

wherein, Vgs represents a voltage difference between a gate voltage Vg and a source voltage Vs of a driving TFT, Vsus represents a sustain driving voltage, Vdata represents a data voltage, Vth represents a threshold voltage of the driving TFT, Vss represents a low potential driving voltage, and k represents a constant value determined by mobility and parasitic capacity of the driving TFT.

The switch circuit includes a first switch device for forming a current path between the high potential driving voltage source and the low potential driving voltage source in response to the second scan pulse, a second switch device for forming a current path between a drain electrode of the driving device and the first node in response to the first scan pulse, a third switch device for forming a current path between the data line and the second node in response to the first scan pulse, and a fourth switch device for forming a current path between the sustain driving voltage source and the second node in response to the second scan pulse.

The OLED includes an anode electrode connected to the high potential driving voltage source and a cathode electrode connected to a drain electrode of the first switch device.

The drain electrode of the driving device is commonly connected to a source electrode of the first switch device and a drain electrode of the second switch device.

The first switch device includes a gate electrode connected to the second gate line, a drain electrode connected to the cathode electrode of the OLED, and a source electrode commonly connected to the drain electrode of the driving device and the drain electrode of the second switch device. The second switch device includes a gate electrode connected to the first gate line, a drain electrode commonly connected to the drain electrode of the driving device and the source electrode of the first switch device, and a source electrode connected to the first node. The third switch device includes a gate electrode connected to the first gate line, a drain electrode connected to the data line, and a source electrode connected to the second node. The fourth switch device includes a gate electrode connected to the second gate line, a drain electrode connected to the sustain driving voltage source, and a source electrode connected to the second node.

In another aspect of the present invention, a method of driving the OLED display that includes: a plurality of data lines to which a data voltage is supplied; a plurality of pairs of gate lines each comprising a first gate line to which a first scan pulse is supplied and a second gate line to which a second scan pulse partially overlapping the first scan pulse in an opposed phase is supplied; a high potential driving voltage source for generating a high potential driving voltage; a low potential driving voltage source for generating a low potential driving voltage; a sustain driving voltage source for generating a sustain driving voltage having a value between the high potential driving voltage and the low potential driving voltage; an OLED that emits light in response to a current that flows from the high potential driving voltage source to the low potential driving voltage source and that flows through the OLED; a driving device for controlling the current that flows through the OLED in accordance with a gate-source voltage applied between a gate electrode connected to a first node and a source electrode connected to the low potential driving voltage source; a storage capacitor connected between the first node and the second node; and a switch circuit for charging the first node by a reset voltage in a first period, for discharging the reset voltage to sustain a potential of the first node as a sum of a threshold voltage of the driving device and the low potential driving voltage and to supply the data voltage to the second node in a second period following the first period, and for increasing a potential of the second node from the data voltage by a voltage difference between the sustain driving voltage and the data voltage in a third period following the second period, in response to the first and second scan pulses is provided, the method including: charging the first node by the reset voltage in the first period; discharging the reset voltage to sustain the potential of the first node as a sum of the threshold voltage of the driving device and the low potential driving voltage and to supply the data voltage to the second node in the second period; and increasing potential of the second node from the data voltage by the voltage difference between the sustain driving voltage and the data voltage in the third period.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention In the drawings:

FIG. 2 is a circuit diagram equivalently illustrating one pixel in a related art OLED display in an active matrix method;

FIG. 3 illustrates an example in which the threshold voltage of a driving thin film transistor (TFT) increases due to positive gate-bias stress;

DETAILED DESCRIPTION OF THE ILLUSTRATED EMBODIMENTS

Figure 4:
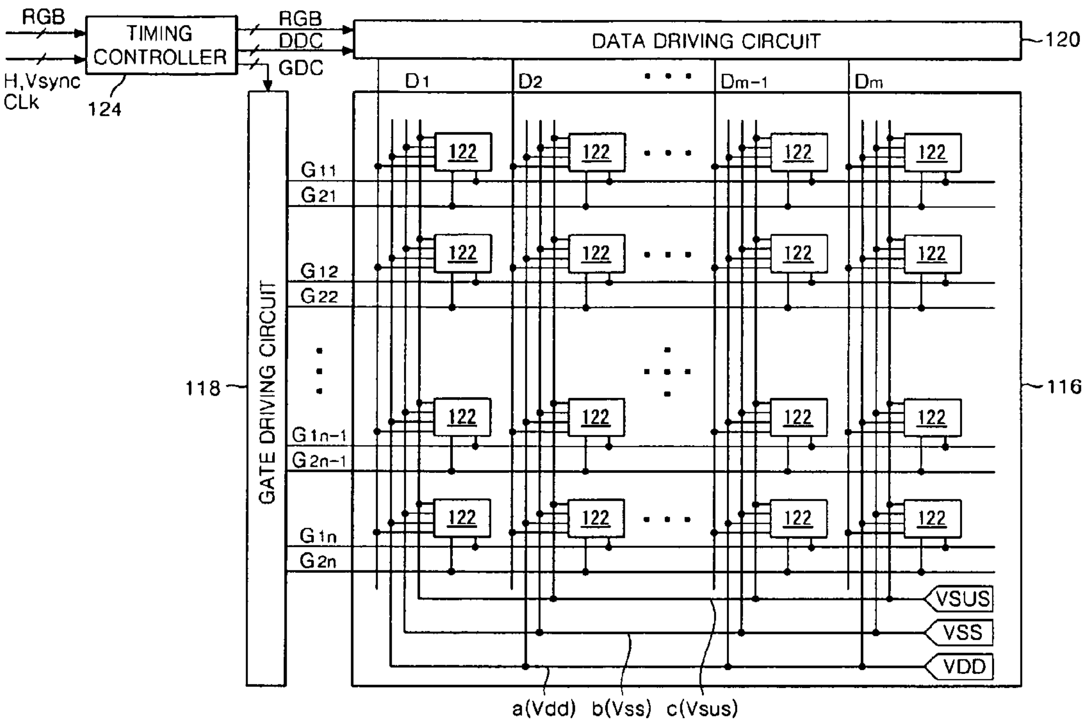
FIG. 4 is a block diagram illustrating an OLED display according to an embodiment of the present invention.
Figure 5:
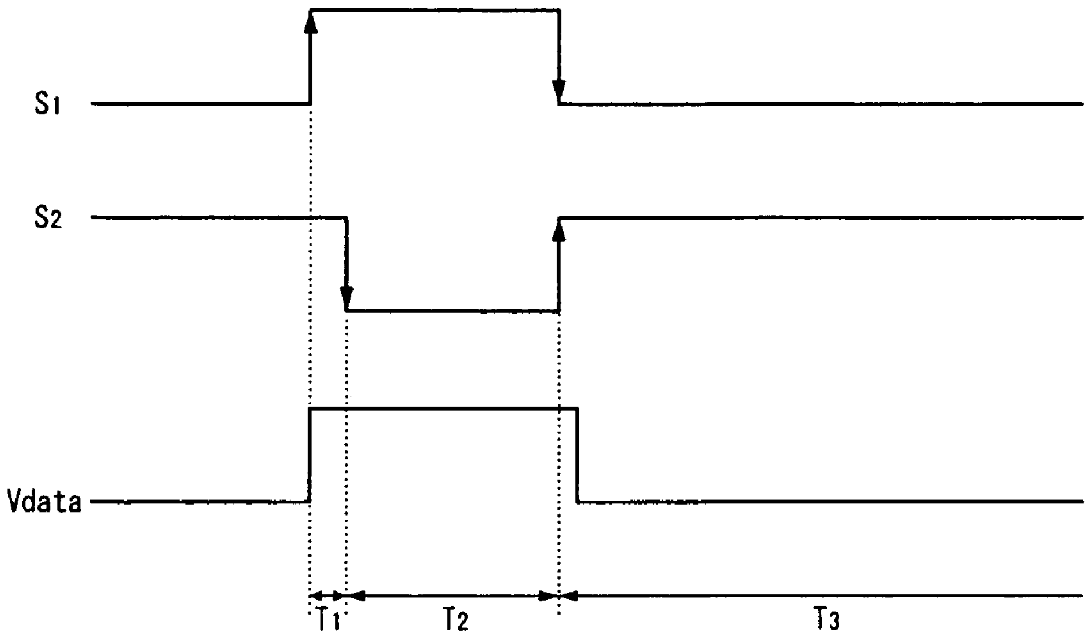
FIG. 5 is a timing diagram showing a pair of scan pulses and a data voltage that are supplied to a pixel of the display of FIG. 4.

Reference will now be made in detail to embodiments of the present invention, examples of which are illustrated in FIGS. 4 to 10 of the accompanying drawings FIG. 4 is a block diagram illustrating an organic light emitting diode (OLED) display according to an embodiment of the present invention. FIG. 5 is a timing diagram showing a pair of scan pulses S1 and S2 and a data voltage Vdata that are supplied to a pixel 122 pf the display of FIG. 4.

Referring to FIGS. 4 and 5, the OLED display according to the embodiment of the present invention includes a display panel 116 in which a matrix of m×n pixels 122 are formed, a data driving circuit 120 for supplying an analog data voltage to data lines D1 to Dm, a gate driving circuit 118 for sequentially supplying a first scan pulse S1 to first gate lines G11 to G1*n* and for sequentially supplying a second scan pulse S2 to second gate lines G21 to G2*n*, and a timing controller 124 for controlling the driving timing of the data driving circuit 120 and the gate driving circuit 118.

The display panel 116 includes pixels 122 formed at the crossings between pairs of gate lines G11G21, G12G22, . . . , and G1*n*G2*n* in which a first and second gate lines one-to-one correspond to make each pair, and data lines D1 to Dm. In the display panel 116, signal wiring lines a for supplying a high potential driving voltage Vdd to the pixels 122, signal wiring lines b for supplying a low potential driving voltage Vss to the pixels 122, and signal wiring lines c for supplying a sustain driving voltage Vsus having potential between the high potential driving voltage Vdd and the low potential driving voltage Vss are formed.

The data driving circuit 120 converts digital video data RGB into an analog data voltage (hereinafter, referred to as a data voltage) in response to a data control signal DDC from the timing controller 124 to supply the analog data voltage to the data lines D1 to Dm. The data voltage is supplied to the pixels 122 via the data lines D1 to Dm.

The gate driving circuit 118 sequentially supplies the pair of scan pulses S1 and S2 illustrated in FIG. 5 to the pairs of gate lines G11G21, G12G22, . . . , and G1*n*G2*n* in response to a gate control signal GDC from the timing controller 124. Among the pair of scan pulses S1 and S2, the first scan pulse S1 is supplied to the pixels 122 via the first gate lines G11 to G1*n* and the second scan pulse S2 is supplied to the pixels 122 via the first gate lines G21 to G2*n*.

The timing controller 124 supplies the digital video data RGB from the outside to the data driving circuit 120 and generates the control signals DDC and GDC for controlling the operation timings of the gate driving circuit 118 and the data driving circuit 120 using vertical/horizontal synchronizing signals H,Vsync and a clock signal CLK.

In the timing diagram of FIG. 5, T1 represents a reset period, T2 represents a threshold voltage sensing period, and T3 represents an emission period.

In the reset period T1, the gate voltage of the driving TFT formed in the pixel 122 is initialized to a reset voltage approximately equal to the high potential driving voltage Vdd. The reset period T1 is defined as a period between the rising edge of the first scan pulse S1 and the falling edge of the second scan pulse S2.

In the threshold voltage sensing period T2, the gate voltage of the driving TFT is discharged from a reset voltage value to a threshold voltage value to sense the threshold voltage of the driving TFT. The threshold voltage sensing period T2 is defined as a period between the falling edge of the second scan pulse S2 and the rising edge of the second scan pulse S2.

In the emission period T3, the OLED emits light by a voltage difference between the gate and source of the driving TFT including the sensed threshold voltage. The emission period T3 is defined as the low logic period of the first scan pulse S1 that starts from the falling edge of the first scan pulse S1 and the high logic period of the second scan pulse S2 that starts from the rising edge of the second scan pulse S2.

The operations of the pixels 122 in the reset period T1, the threshold voltage sensing period T2, and the emission period T3 will be described in detail with reference to FIGS. 7 to 9.

A high potential driving voltage source VDD for supplying the high potential driving voltage Vdd to the pixels 122, a low potential driving voltage source VSS for supplying the low potential driving voltage Vss, and a sustain driving voltage source VSUS having potential between the high potential driving voltage and the low potential driving voltage are connected to the display panel 116. The low potential driving voltage Vss supplied from the low potential driving voltage source VSS may be commonly set as a ground voltage Ground.

Figure 6:
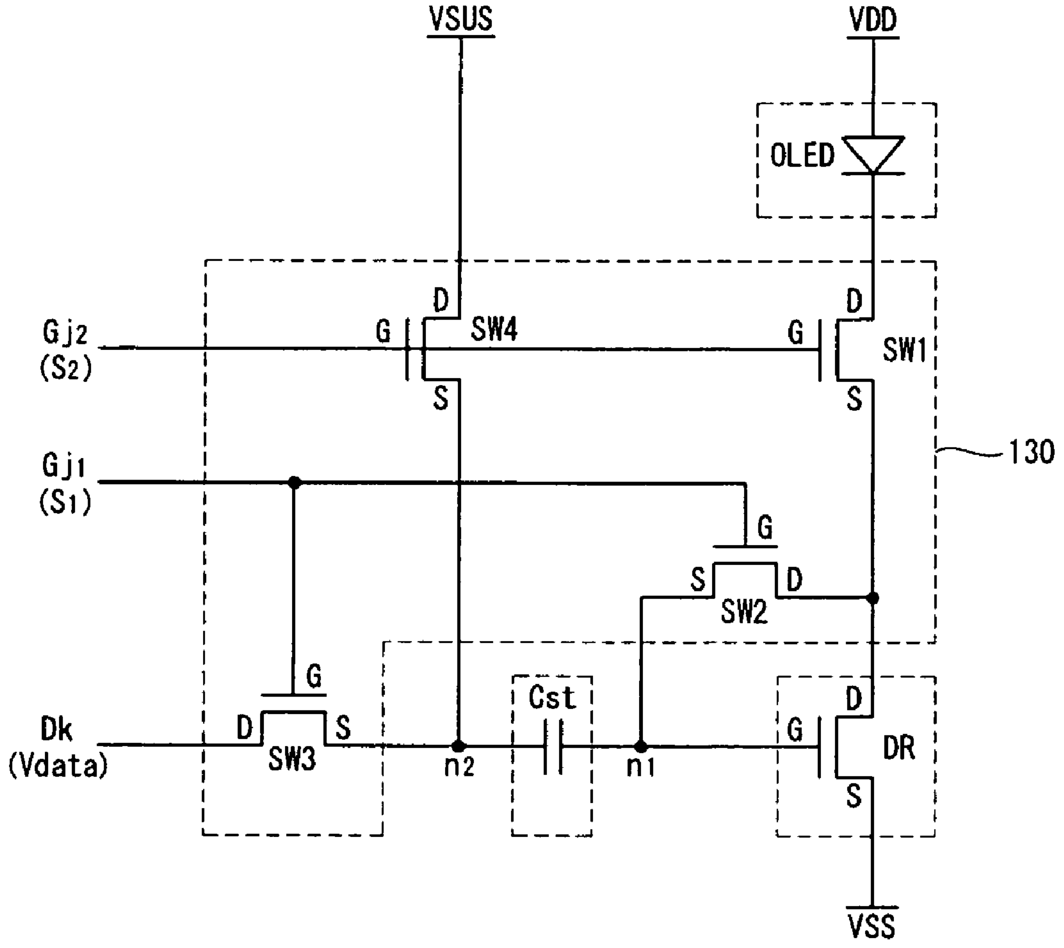
FIG. 6 is an equivalent circuit diagram illustrating the [j,k]th pixel in the OLED display according to the embodiment of the present invention.

Each of the pixels 122 includes the OLED, the driving TFT DR, four switches TFTs SW1 to SW4, and the storage capacitor Cst as illustrated in FIG. 6.

FIG. 6 is an equivalent circuit diagram illustrating the [j,k]th pixel 122 included in the OLED display according to the embodiment of the present invention.

Referring to FIG. 6, the pixel 122 according to the embodiment of the present invention includes the OLED, the driving TFT DR, the switch circuit 130, and the storage capacitor Cst that are formed at the crossing between the kth data line Dk and the jth pair of gate lines Gj1 and Gj2.

Figure 1:
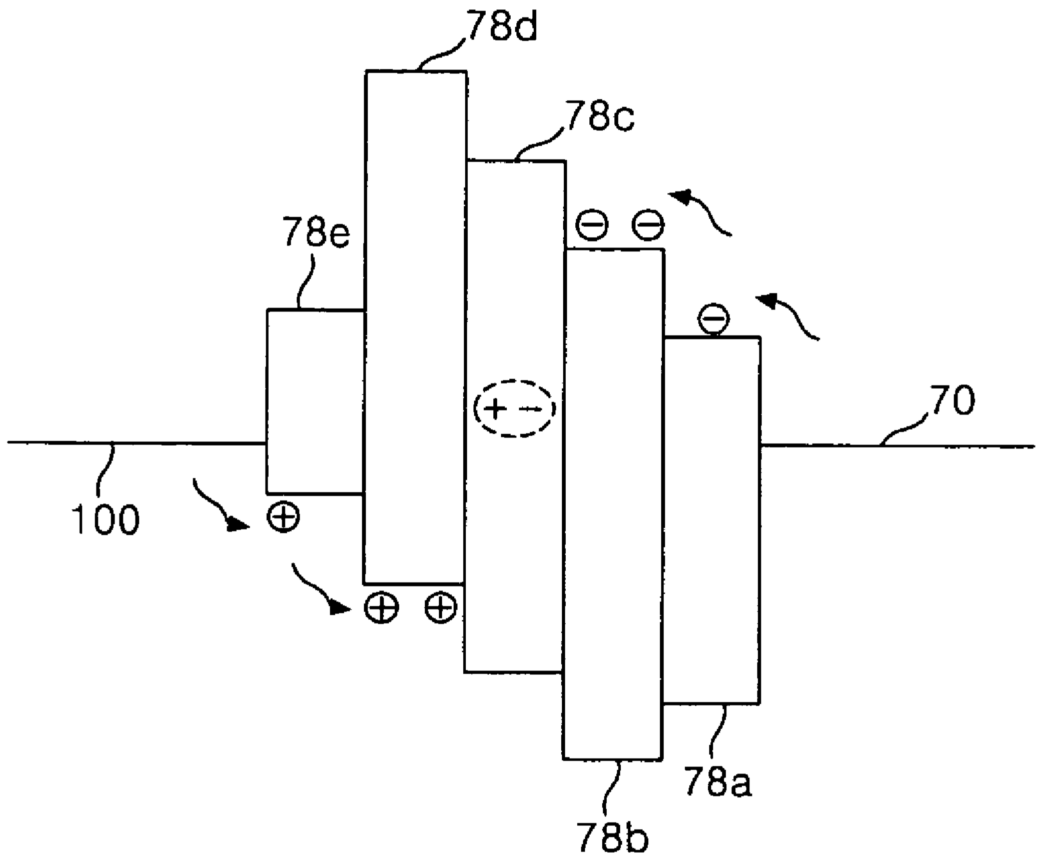
FIG. 1 (Related Art)
FIG. 1 is a diagram illustrating the luminescence principle of a common OLED display.

The anode electrode of the OLED is connected to the high potential driving voltage source VDD and the cathode electrode of the OLED is connected to the switch circuit 130. The OLED has the structure illustrated in FIG. 1 and emits light by the driving current controlled by the driving TFT DR.

The gate electrode G of the driving TFT DR is connected to a first node n1, the drain electrode D of the driving TFT DR is connected to the switch circuit 130, and the source electrode S of the driving TFT DR is connected to the low potential driving voltage source VSS. The driving TFT DR controls the amount of current that flows through the OLED in accordance with a voltage difference Vgs between the gate voltage applied to the gate electrode G thereof and the source voltage applied to the source electrode S thereof. Here, the driving TFT DR is realized by an N-type electronic metal-oxide semiconductor field effect transistor. The semiconductor layer of the driving TFT DR includes an amorphous silicon layer.

The switch circuit 130 includes the first to fourth switch TFTs SW1 to SW4. The switch circuit 130 charges the first node n1 to the reset voltage in response to the pair of scan pulses S1 and S2 supplied to the jth pair of gate lines Gj1 and Gj2, diode-connects the driving TFT DR to discharge the reset voltage so that the potential of the first node n1 is sustained as the threshold voltage of the driving TFT DR, allows current to flow through a current path between the data line Dk and a second node n2 to supply a data voltage Vdata to the second node n2, and allows current to flow through a current path between the sustain driving voltage source VSUS and the second node n2 to supply the sustain driving voltage to the second node n2.

Therefore, the gate electrode G of the first switch TFT SW1 is connected to the second gate line Gj2 among the jth pair of gate lines Gj1 and Gj2, the drain electrode D of the first switch TFT SW1 is connected to the cathode electrode of the OLED, and the source electrode S of the first switch TFT SW1 is connected to the drain electrode D of the driving TFT DR. The gate electrode G of the second switch TFT SW2 is connected to the first gate line Gj1 among the jth pair of gate lines Gj1 and Gj2, the drain electrode D of the second switch TFT SW2 is commonly connected to the source electrode S of the first switch TFT SW1 and the drain electrode D of the driving TFT DR, and the source electrode S of the second switch TFT SW2 is connected to the first node n1. The first and second switches TFTs SW1 and SW2 are driven in response to the first and second scan pulses S1 and S2 to charge the first node n1 by the reset voltage approximate to the high potential driving voltage and connects the driving TFT DR to act, as a diode to discharge the reset voltage and to converge the potential of the first node n1 to the sum of the threshold voltage of the driving TFT DR and the low potential driving voltage Vss.

The gate electrode G of the third switch TFT SW 3 is connected to the first gate line Gj1 among the jth pair of gate lines Gj1 and Gj2, the drain electrode D of the third switch TFT SW3 is connected to the kth data line Dk, and the source electrode S of the third switch TFT SW3 is connected to the second node n2. The third switch TFT SW3 is turned on in response to the first scan pulse S1 so that current flows through the current path between the data line Dk and the second node n2 to supply the data voltage Vdata to the second node n2.

The gate electrode G of the fourth switch TFT SW 4 is connected to the second gate line Gj2 among the jth pair of gate lines Gj1 and Gj2, the drain electrode D of the fourth switch TFT SW4 is connected to the sustain driving voltage source VSUS, and the source electrode S of the fourth switch TFT SW4 is connected to the second node n2. The fourth switch TFT SW4 allows current to flow through a current path between the sustain driving voltage source VSUS and the second node n2 to supply the sustain driving voltage to the second node n2. The sustain driving voltage changes the potential of the second node n2 from the stored data voltage Vdata to a voltage difference between the sustain driving voltage and the data voltage to boost up the potential of the first node n1 through the storage capacitor Cst.

One electrode of the storage capacitor Cst is connected to the first node n1 and the other electrode of the storage capacitor Cst is connected to the second node n2. The storage capacitor Cst sustains the potential of the boosted up first node n1 including the threshold voltage of the driving TFT DR to be uniform in a period where the OLED emits light.

The operation of the pixel 122 will be described in stages with reference to FIGS. 7 to 9.

Figure 7:
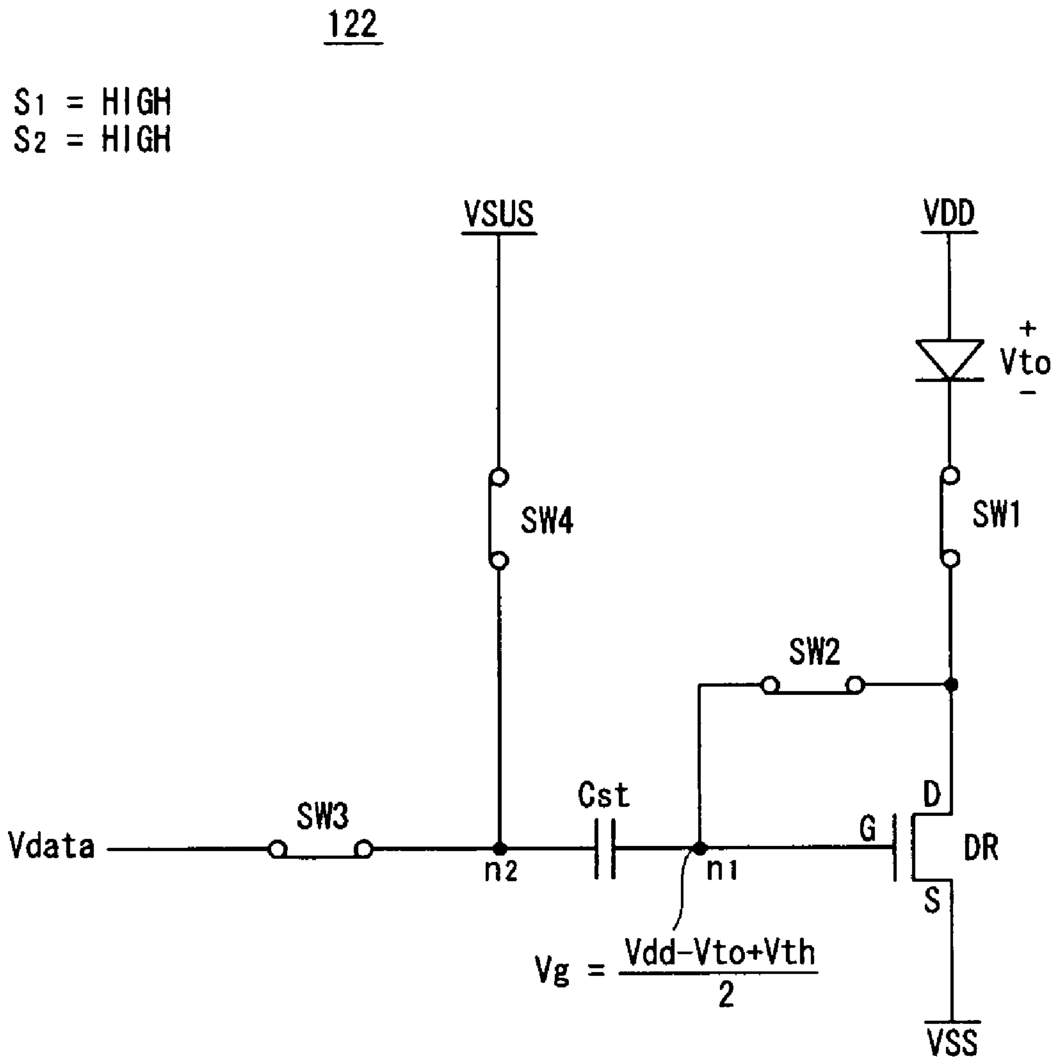
FIG. 7 is an equivalent circuit diagram of the pixel in the reset period T1 of FIG. 5.

FIG. 7 is an equivalent circuit diagram of the pixel 122 in the reset period T1 of FIG. 5.

Referring to FIG. 7, in the reset period T1, the first scan pulse S1 is generated to have a high logic voltage level to turn on the second switch TFT SW2 and the second scan pulse S2 is generated to have the high logic voltage level to turn on the first switch TFT SW1.

Therefore, the reset voltage Vrs according to EQUATION 2 is supplied to the first node n1.

$$Vrs=(Vdd-Vto+Vth)/2, \qquad \text{[EQUATION 2]}$$

In EQUATION 2, Vdd represents the high potential driving voltage, Vto represents the threshold voltage of the OLED, and Vth represents the threshold voltage of the driving TFT DR.

On the other hand, in the reset period T1, the third and fourth switch TFTs SW3 and SW4 are turned on in response to the first and second scan pulses S1 and S2 to supply the sustain driving voltage and the average voltage of the data voltage Vdata to the second node n2.

Figure 8:
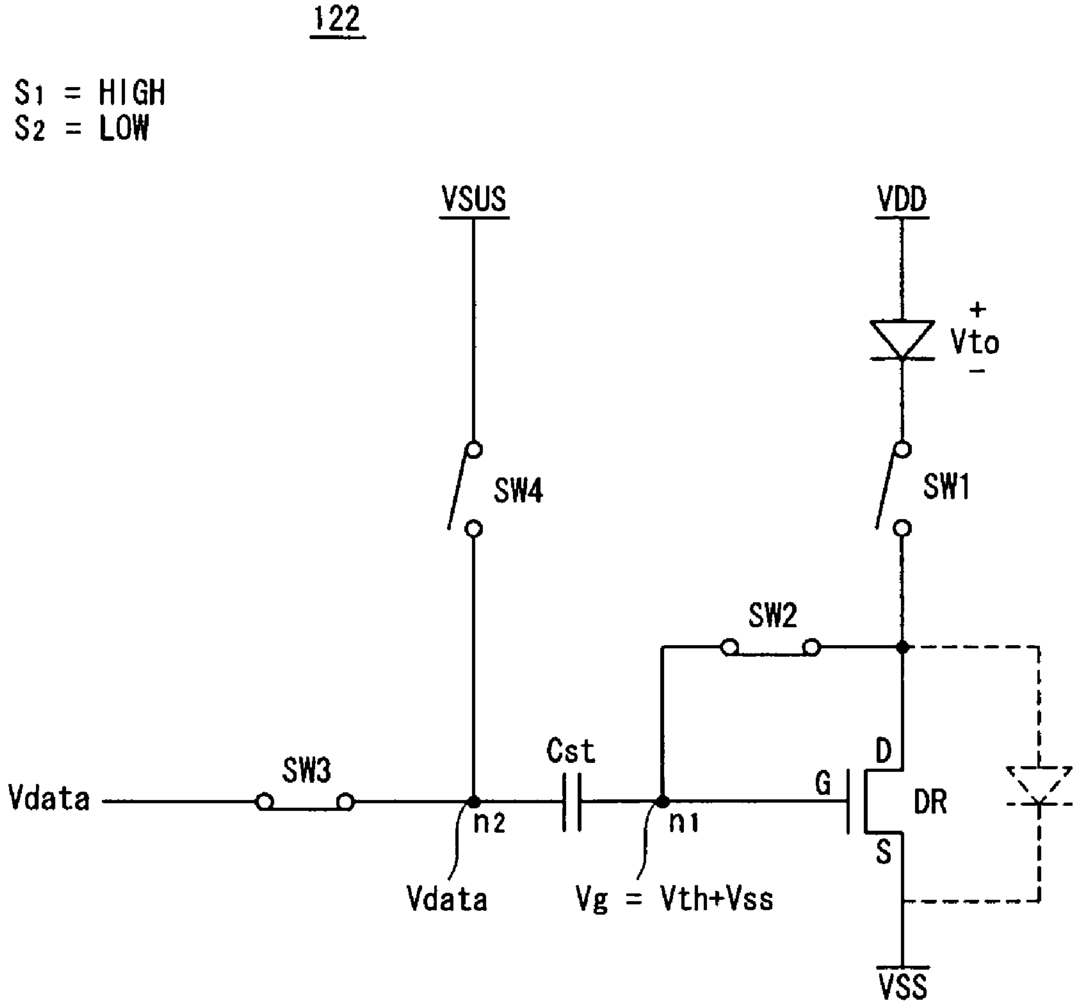
FIG. 8 is an equivalent circuit diagram of the pixel in the threshold voltage sensing period T2 of FIG. 5.

FIG. 8 is an equivalent circuit diagram of the pixel 122 in the threshold voltage sensing period T2 of FIG. 5.

Referring to FIG. 8, in the threshold voltage sensing period T2, the first scan pulse S1 is sustained at the high logic voltage to sustain the second switch TFT SW2 and the third switch TFT SW3 to be turned on and the second scan pulse S2 is inverted into a low logic voltage to turn off the first switch TFT SW1 and the fourth switch TFT SW4.

Therefore, the potential of the first node n1 converges from the reset voltage Vrs to the sum Vth+Vss of the threshold voltage Vth and the low potential driving voltage Vss of the driving TFT DR by a discharge process through the driving TFT DR that operates (shown in a dotted line) like a diode, the potential of the second node n2 converges from the average voltage of the sustain driving voltage and the data voltage Vdata to the data voltage Vdata. The potential of the first and second nodes n1 and n2 is sustained to be uniform with the storage capacitor Cst interposed.

Figure 9:
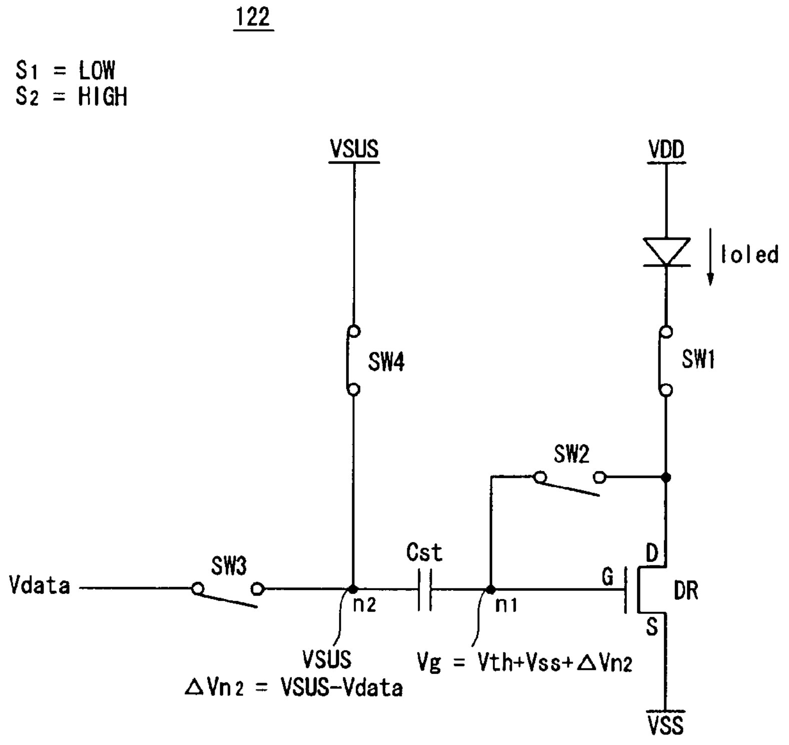
FIG. 9 is an equivalent circuit diagram of the pixel in the emission period T3 of FIG. 5.

FIG. 9 is an equivalent circuit diagram of the pixel 122 in the emission period T3 of FIG. 5.

Referring to FIG. 9, in the emission period T3, the first scan pulse S1 is inverted into the low logic voltage to turn off the second switch TFT SW2 and the third switch TFT SW3 and the second scan pulse S2 is inverted into the high logic voltage to turn on the first switch TFT SW1 and the fourth switch TFT SW4.

Therefore, since the sustain driving voltage is supplied from the sustain driving voltage source VSUS to the second node n2, the potential of the second node n2 changes from the previously stored data voltage Vdata by a voltage difference Δn2=VSUS−Vdata between the sustain driving voltage and the data voltage. Since the first node n1 is connected to the second node n2 with the storage capacitor Cst interposed, when the potential of the second node n2 changes, the potential of the first node n1 changes by the change Δn2 in the potential of the second node n2. For example, when the sustain driving voltage has a larger value than the data voltage Vdata, the potential of the second node n2 increases and the potential of the first node n1 is also boosted up through the storage capacitor Cst. That is, the potential of the first node n1 increases from the previously stored sum Vth+Vss by the change Δn2. The potential of the first node n1 is sustained to be uniform by the sustain driving voltage continuously supplied to the second node n2 in the emission period T3. Since the voltage charged in the first node n1 has the same potential as the gate voltage Vg of the driving TFT DR, the driving current Ioled that flows through the OLED is obtained by EQUATION 3.

$$\begin{aligned} &Vg = Vsus - Vdata + Vss + Vth,\ Vs = Vss \qquad \text{[EQUATION 3]}\\ &Vgs = Vsus - Vdata + Vth\\ &Ioled = \frac{k}{2}(Vgs - Vth)^2\\ &\quad = \frac{k}{2}(Vsus - Vdata + Vth - Vth)^2\\ &\quad = \frac{k}{2}(Vsus - Vdata)^2 \end{aligned}$$

In EQUATION 3, Vgs represents the voltage difference between the gate voltage Vg and the source voltage Vs of the driving TFT DR, Vsus represents the sustain driving voltage, Vdata represents the data voltage, Vth represents the threshold voltage of the driving TFT DR, Vss represents the low potential driving voltage, and k represents a constant value determined by the mobility and parasitic capacitance of the driving TFT DR.

Since the threshold voltage Vth of the driving TFT DR and the low potential driving voltage Vss are not included in the function of EQUATION 3, the driving current Ioled that flows through the OLED is not affected by the change in the threshold voltage Vth of the driving TFT DR and the potential of the low potential driving voltage Vss. Therefore, the deterioration of display quality that is caused by a difference in the change of the threshold voltage Vth of the driving TFT DR among pixels and a difference in the potential of the low potential driving voltage Vss among the pixels is minimized.

Figure 10:
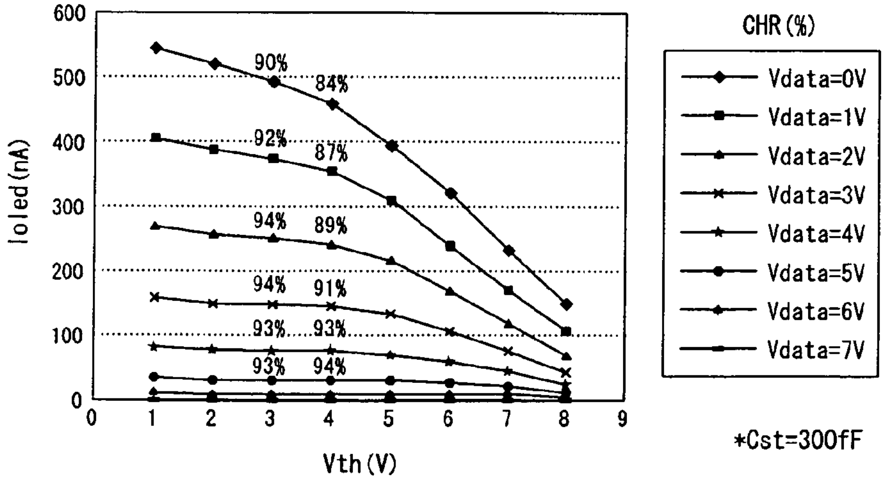
FIG. 10 illustrates a simulation result showing a change in the amount of driving current that flows through an OLED in accordance with a change in the threshold voltage of the driving TFT.

FIG. 10 illustrates a simulation result showing a change in the amount of driving current that flows through the OLED in accordance with the change in the threshold voltage Vth of the driving TFT DR. In FIG. 10, the axis of ordinate represents the driving current Ioled and the axis of abscissa represents the threshold voltage Vth of the driving TFT DR. Under the conditions for the simulation, the sustain driving voltage VSUS is 7V, the high potential driving voltage Vdd is 14V, the low potential driving voltage VSS is 0V, the scan pulses S1 and S2 are −5V to 20V, the data voltage Vdata is between 0V to 7V, and the capacity of the storage capacitor Cst is 300 fF.

Referring to FIG. 10, according to the embodiment of the present invention, it is noted that, although the threshold voltage Vth of the driving TFT DR increases to 3V by the gate bias stress, the amount of current that flows through the OLED is sustained no less than 90% in comparison with the initial state before the increase in the threshold voltage Vth under the same data voltage. This shows that, considering that the amount of driving current is reduced to no more than 70% of the initial value when the threshold voltage Vth of the related art driving TFT DR increases from 1.5V to just 2V, the current sustaining ratio CHR (%) for the OLED according to the present invention is remarkably increased. Therefore, in the OLED according to the embodiment of the present invention, although the threshold voltage Vth of the driving TFT DR changes, the amount of current that flows through the OLED does not change so substantially so that the display quality can be remarkably improved.

On the other hand, according to the present invention, although the driving current Ioled is theoretically unaffected by the change in the threshold voltage Vth of the driving TFT DR, the driving current Ioled is actually slightly affected by the change in the threshold voltage Vth of the driving TFT DR as illustrated in FIG. 10 due to value of the k being determined by the mobility and parasitic capacitance of the driving TFT DR and due to the potential value of a wiring line for supplying the sustain driving voltage Vsus are included in the function of the EQUATION 3.

As described above, in the OLED display according to the present invention and the method of driving the same, the threshold voltage of the driving TFT is not included in the gate-source voltage of the driving TFT so that the current that flows through the OLED is not affected by the change in the threshold voltage of the driving TFT to improve the display quality and to remarkably improve the life of the OLED display. Furthermore, in the OLED display according to the present invention and the method of driving the same, the low potential driving voltage that is the voltage of the source of the driving TFT is included in the gate-source voltage of the driving TFT so that the current that flows through the OLED is not affected by the change in the potential of the low potential driving voltage to improve the display quality.

While the invention has been shown and described with respect to the embodiments, it will be understood by those skilled in the art that various changes and modifications may be made without departing from the spirit and scope of the invention as defined in the following claims. For example, according to the embodiment of the present invention, the driving TFT is realized by the N-type MOSFET. However, the present invention is not limited to the above and the driving TFT can be realized by a P-type MOSFET. Therefore, the scope of the present invention is not limited to the particular embodiments described in the detailed description of the specification but is to be determined by the scope of the claims.

What is claimed is:

1. An organic light emitting diode (OLED) display, comprising:

a plurality of data lines to which a data voltage is supplied;

a plurality of pairs of gate lines each comprising a first gate lines to which a first scan pulse is supplied and a second gate lines to which a second scan pulse-partially overlapping the first scan pulse in an opposed phase is supplied;

a high potential driving voltage source for generating a high potential driving voltage;

a low potential driving voltage source for generating a low potential driving voltage;

a sustain driving voltage source for generating a sustain driving voltage having a value between the high potential driving voltage and the low potential driving voltage;

an OLED that emits light by current that flows between the high potential driving voltage source and the low potential driving voltage source;

a driving device comprising a drain electrode, a gate electrode connected to a first node, and a source electrode connected to the low potential driving voltage source to control the current that flows through the OLED;

a storage capacitor connected between the first node and a second node; and a switch circuit, comprising a first switch device for switching a current path between the OLED and a drain electrode of the driving device in response to the second scan pulse;

a second switch device for switching a current path between the drain electrode of the driving device and the first node in response to the first scan pulse;

a third switch device for switching a current path between the data line and the second node in response to the first scan pulse; and a fourth switch device for switching a current path between the sustain driving voltage source and the second node in response to the second scan pulse, wherein the first and second scan pulses have opposed phases in other periods than a period between a rising edge of the first scan pulse and a falling edge of the second scan pulse generated after the rising edge of the first scan pulse.

2. The OLED display of claim 1, wherein the first period is a reset period between a rising edge of the first scan pulse and a falling edge of the second scan pulse generated later than the rising edge of the first scan pulse, wherein the second period is a threshold voltage sensing period between a falling edge of the second scan pulse and a rising edge of the second scan pulse generated at a moment when a falling edge of the first scan pulse is generated, and wherein the third period is an emission period defined as a low logic period of the first scan pulse that starts from the falling edge of the first scan pulse and a high logic period of the second scan pulse that starts from the rising edge of the second scan pulse.

3. The OLED of claim 2, wherein current bled that flows through the OLED in the emission period is obtained by following EQUATION.

$$Vg = Vsus - Vdata + Vss + Vth,\ Vs = Vss$$

$$Vgs = Vsus - Vdata + Vth$$

$$\begin{aligned} Ioled &= \frac{k}{2}(Vgs - Vth)^2 \\ &= \frac{k}{2}(Vsus - Vdata + Vth - Vth)^2 \\ &= \frac{k}{2}(Vsus - Vdata)^2 \end{aligned}$$

wherein, Vgs represents a voltage difference between a gate voltage and a source voltage of a driving device, Vsus represents a sustain driving voltage, Vdata represents a data voltage, Vth represents a threshold voltage of the device, Vss represents a low potential driving voltage, and k represents a constant value determined by mobility and parasitic capacity of the device.

4. The OLED display of claim 1, wherein the OLED comprises:

an anode electrode connected to the high potential driving voltage source; and a cathode electrode connected to a drain electrode of the first switch device.

5. The OLED display of claim 1, wherein the drain electrode of the driving device is commonly connected to a source electrode of the first switch device and a drain electrode of the second switch device.

6. The OLED display of claim 5, wherein the first switch device comprises a gate electrode connected to the second gate line, a drain electrode connected to the cathode electrode of the OLED, and a source electrode commonly connected to the drain electrode of the driving device and the drain electrode of the second switch device, wherein the second switch device comprises a gate electrode connected to the first gate line, a drain electrode commonly connected to the drain electrode of the driving device and the source electrode of the first switch device, and a source electrode connected to the first node, wherein the third switch device comprises a gate electrode connected to the first gate line, a drain electrode connected to the data line, and a source electrode connected to the second node, and wherein the fourth switch device comprises a gate electrode connected to the second gate line, a drain electrode connected to the sustain driving voltage source, and a source electrode connected to the second node.

7. The OLED display of claim 1, wherein the switch circuit changes the first node by a reset voltage in a first period, discharges the reset voltage to sustain a potential of the first node as a sum of a threshold voltage of the driving device and the low potential driving voltage and to supply the data voltage to the second node in a second period following the first period, and increases a potential of the second node from the data voltage by a voltage difference between the sustain driving voltage and the data voltage in a third period following the second period, in response to the first and second scan pulses, wherein the reset voltage is obtained by following equation, $$Vrs=(Vdd-Vto+Vth)/2$$

wherein Vdd represents the high potential driving voltage, Vto represents the threshold voltage of the OLED, and Vth represents the threshold voltage of the driving device.

* * * * *